United States Patent

Coureau et al.

(10) Patent No.: US 9,544,760 B2
(45) Date of Patent: Jan. 10, 2017

(54) METHOD OF ACTIVATION ON A SECOND NETWORK OF A TERMINAL COMPRISING A MEMORY MODULE ASSOCIATED WITH A FIRST NETWORK

(71) Applicant: Orange, Paris (FR)

(72) Inventors: Laurent Coureau, Morangis (FR); Philippe Lucas, Bievres (FR); Eric Mora, Les Lilas (FR)

(73) Assignee: ORANGE, Paris ( * ) Notice: Subject to any disclaimer, the term of this patent is extended or adjusted under 35 U.S.C. 154(b) by 92 days.

(21) Appl. No.: 14/370,924

(22) PCT Filed: Dec. 20, 2012

(86) PCT No.: PCT/FR2012/053020
§ 371 (c)(1),
(2) Date: Jul. 7, 2014

(87) PCT Pub. No.: WO2013/102722
PCT Pub. Date: Jul. 11, 2013

(65) Prior Publication Data
US 2015/0004961 A1    Jan. 1, 2015

(30) Foreign Application Priority Data

Jan. 5, 2012   (FR) .................................. 12 50127

(51) Int. Cl.
*H04M 3/16*   (2006.01)
*H04W 8/24*   (2009.01)
(Continued)

(52) U.S. Cl.
CPC .......... *H04W 8/245* (2013.01); *H04L 63/0853* (2013.01); *H04L 63/0876* (2013.01);
(Continued)

(58) Field of Classification Search
CPC ...... H04W 12/06; H04W 4/003; H04W 88/06; H04W 8/205; H04W 8/245; H04W 8/265; H04M 1/72525
(Continued)

(56) References Cited

U.S. PATENT DOCUMENTS 7,206,589 B1 *   4/2007   Kall ..................... H04W 28/18
                                                              348/118
2009/0253409 A1 * 10/2009  Slavov ............... H04L 63/0823
                                                              455/411
(Continued)

FOREIGN PATENT DOCUMENTS

GB       2473753 A *   3/2011   ............. H04L 12/14
WO   2009073305 A1     6/2009

OTHER PUBLICATIONS

International Search Report and Written Opinion dated May 29, 2013 for corresponding International Application No. PCT/FR2012/053020, filed Dec. 20, 2012.
(Continued)

*Primary Examiner* — Charles Shedrick
(74) *Attorney, Agent, or Firm* — David D. Brush; Westman, Champlin & Koehler, P.A.

(57) ABSTRACT

A method is provided for activating, on a second network, a terminal having a memory module including a temporary identification datum and being associated in a central database with a first predetermined network. The method includes a first step of authenticating the memory module with the central database by way of the temporary identification datum, a step of determining a new identification datum following an activation of the terminal in the second network, and transmitting this new identification datum to the memory module for storage on the memory module.
(Continued)

Also provided are an associated computing entity and a terminal containing the associated memory module.

12 Claims, 3 Drawing Sheets

(51) Int. Cl.
    *H04W 12/06*     (2009.01)
    *H04L 29/06*     (2006.01)
    *H04W 4/00*     (2009.01)
    *H04W 8/20*     (2009.01)
    *H04W 88/06*     (2009.01)

(52) U.S. Cl.
    CPC ........... *H04W 4/003* (2013.01); *H04W 8/205* (2013.01); *H04W 12/06* (2013.01); *H04W 88/06* (2013.01)

(58) Field of Classification Search
    USPC ................................................ 455/410–411
    See application file for complete search history.

(56) References Cited

U.S. PATENT DOCUMENTS

| | | | |
|---|---|---|---|
| 2009/0305668 A1 | 12/2009 | Ahn et al. ..................... 455/410 |
| 2010/0203864 A1* | 8/2010 | Howard ................ H04W 12/04 455/411 |
| 2012/0282924 A1* | 11/2012 | Tagg ....................... H04W 8/04 455/432.1 |
| 2014/0129942 A1* | 5/2014 | Rathod ............ H04N 21/44222 715/720 |
| 2015/0134536 A1* | 5/2015 | Li ......................... G06Q 20/32 705/66 |

OTHER PUBLICATIONS

English translation of Written Opinion dated May 29, 2013 for corresponding International Application No. PCT/FR2012/053020, filed Dec. 20, 2012.

* cited by examiner

METHOD OF ACTIVATION ON A SECOND NETWORK OF A TERMINAL COMPRISING A MEMORY MODULE ASSOCIATED WITH A FIRST NETWORK

CROSS-REFERENCE TO RELATED APPLICATIONS

This Application is a Section 371 National Stage Application of International Application No. PCT/FR2012/053020, filed Dec. 20, 2012, which is incorporated herein by reference in its entirety and published as WO 2013/102722 on Jul. 11, 2013, not in English.

FIELD OF THE DISCLOSURE

The object of the present invention relates to the field of activation and management of memory modules embedded in terminals such as telecommunication terminals.

In the context of the present invention, the memory modules are associated with an original network, referred to herein as the first network. An object of the present invention is to activate, on a second network, terminals which have such embedded memory modules, in order to manage them on the second network as local subscribers.

BACKGROUND OF THE DISCLOSURE

Currently, some terminals contain a memory module when manufactured. Such terminals may integrate such a memory module directly: in this case, the memory module is for example welded directly to the terminal; alternatively, the memory module may be a removable and interchangeable module. In either event, such a module is intended to contain specific and personal information about the network subscriber.

When such memory modules do not allow loading a new subscription to another network, the set of data concerning the subscriber authentication on said other network must be preloaded. This kind of preloading is tedious and has many limitations, for example requiring that sensitive data be preloaded (security algorithms, subscriber certificates, etc.).

In addition, if such terminals are distributed across multiple countries, there needs to be a new type of subscription that allows managing the terminal locally and using the services of the network where the terminal is activated, and this must be possible for each country where the terminals are distributed.

There is currently no simple solution for such terminal activation and management. The various solutions proposed so far are complex and require substantial changes to the memory modules and terminals as well as to the network architecture.

SUMMARY

An object of the invention relates to a method for the activation, on a second network, of a terminal comprising a memory module containing a temporary identification data item, the memory module being associated in a central database with a predetermined first network.

Advantageously, the activation method of the invention comprises a first step of authenticating the memory module with the central database, following a first connection of the terminal to the first network via an interworking gateway. The interworking gateway here interconnects the first and second network.

This first authentication step is achieved in particular by means of the temporary identification data item. This temporary identification data item is initially stored in the memory module, allowing a design with a single type of memory module which is recognizable by a same first authentication module regardless of the network where the terminal is activated.

Advantageously, this authentication is performed with the central database on the first network.

The activation method of the present invention then includes a determination step; this determination step consists of determining a new identification data item following an activation of the terminal on the second network.

Advantageously, the determination of this new identification data item during the determination step is made from among a plurality of predetermined identification data items in the central database. The formation of a central database comprising a plurality of previously stored data items enables carriers to open up their subscription plans.

Advantageously, the determination step consists of processing information concerning the second network where the terminal is activated. This information is transmitted to the central database when the terminal first connects to the first network via the first interworking gateway. In an advantageous variant, the identification data item comprises information relating to a geographical area, a country, or a predetermined local carrier for that geographical area or country.

The activation method according to the invention further comprises a first transmission step consisting of transmitting this new identification data item to the memory module in order to store this new identification data item in the memory module.

With this succession of technical steps that are characteristic of the present invention, it is possible to activate the memory module on the second network when connecting for the first time to the first network by means of an interworking gateway. This activation is achieved in particular after authentication and after updating the identification data item, this authentication and updating occurring as a function of the second network. During the next connection of the terminal to the second network, the memory module is recognized as activated on the second network. The terminal user can access the services of the second network as a subscriber of that network.

With the technical solution provided by the invention, it is possible to manufacture a single type of terminal containing a single type of memory module. The solution implemented by the invention thus allows the design of a single general memory module that can be activated and can operate in all the networks initially predetermined by the carrier, with this activation occurring by a first authentication on a first network or original network.

The object of the invention therefore advantageously allows easily switching a terminal from roaming traffic to local traffic. The invention thus puts an end to the "permanent roaming" proposed in the past.

With this solution, it is also unnecessary for carriers to share sensitive data, for example such as security algorithms or certificates concerning the subscriber, in order to switch from one network to another.

Once the memory module is activated on the second network, the terminal can be used on the second network as a local subscriber terminal. This is a second phase, referred to as the nominal phase, which follows the activation described above. For this purpose, the activation method according to the invention comprises a second authentication step for authenticating the memory module with the central database by means of the identification data item. This second authentication step is performed following a second connection of the terminal to the first network via the interworking gateway. The second authentication step allows managing the access of the terminal to the services of the second network.

Advantageously, the second authentication step consists of comparing the identification data item with the central database.

Optionally, following this second authentication step, the activation method according to the invention comprises a second transmission step which consists of transmitting the result of the second authentication step to the interworking gateway.

The activation method of the present invention thus allows activation of a memory module on a second network so that the associated terminal accesses the services of said second network as a "local" subscriber. Local management of the memory module on the second network then applies, although the activation and authentication are still performed by the first network.

Correspondingly, an object of the present invention concerns a computer program comprising instructions for executing the steps of the activation method as described above, when the computer program is executed by a computer.

Such a computer program may use any programming language, and may be in the form of source code, object code, or an intermediate code between source code and object code such as a partially compiled form, or any other desirable form.

Similarly, an object of the present invention relates to a computer-readable storage medium on which is stored a computer program comprising instructions for executing the steps of the activation method as described above.

The storage medium may be any entity or device capable of storing the program. For example, the medium may comprise storage means such as ROM memory, for example a CD-ROM or a ROM microelectronic circuit, or magnetic storage means, for example a diskette (floppy disk) or hard drive.

Or this storage medium may be a transmission medium such as an electrical or optical signal; such a signal can be conveyed via an electrical or optical cable, by terrestrial or over-the-air radio, or by self-directed laser beam, or by other means. The computer program according to the invention may in particular be downloaded on a network such as the Internet.

Alternatively, the storage medium may be an integrated circuit in which the computer program is embedded, the integrated circuit being adapted to execute or be used in the execution of the method in question.

The object of the invention also relates to a computing entity for the activation of a terminal on a second network, said terminal comprising a memory module which contains a temporary identification data item and is associated in a central database with a predetermined first network.

The computing entity according to the invention is suitable for implementing the different technical steps of the activation method described above.

More specifically, the computing entity according to the invention comprises an authentication module comprising a first authentication means configured to allow authentication of the memory module with the central database. This authentication is carried out in particular by means of the temporary identification data item, following a first connection of the terminal to the first network via an interworking gateway.

The authentication module further comprises a determination means configured for determining a new identification data item, following an activation of the terminal on the second network. In an advantageous variant, this identification data item comprises information relating to a geographical area, a country, or a predetermined local carrier for that geographical area or country.

The authentication module also comprises a first transmission means configured for transmitting this new identification data item to the memory module in order to store this new identification data item in the memory module.

Thus, by means of these various technical component elements of the computing entity according to the invention, the memory module of the terminal is recognized as activated on the second network.

Advantageously, the determination means is configured so that the new identification data item is determined from among a plurality of predetermined identification data items in the central database.

Advantageously, the determination means is configured to process information relating to the second network where the terminal is activated; this information is sent to the central database upon the first connection of the terminal to the first network via the interworking gateway.

Advantageously, the computing entity according to the invention comprises a second authentication module. This second authentication module comprises a second authentication means configured to enable authentication of the memory module with the central database; this authentication is achieved by means of the identification data item, following a second connection of the terminal to the first network via the interworking gateway.

This second phase, called the nominal phase, allows managing the accesses of the terminal to the services of the second network after activation.

Advantageously, the second authentication means is configured to compare the identification data item with the central database.

Advantageously, the second authentication module comprises a second transmission means configured for transmitting the result of the authentication to the interworking gateway.

Advantageously, although functionally different, it is possible in an alternative embodiment of the invention for the first and second authentication modules to be combined and correspond to a single physical entity.

Another aspect of the invention relates to the actual terminal and to the management method that is implemented thereon; this other aspect of the invention is the corollary to the method and the computing entity described above.

Specifically, one of the other aspects of the invention relates to a method for managing, in a second network, a terminal comprising a memory module associated in a central database with a predetermined first network and containing a temporary identification data item.

Advantageously, to allow managing the terminal on the second network, the management method according to the invention comprises a first step of connecting the terminal to the first network via an interworking gateway in order to establish, using the temporary identification data item, a first authentication of the memory module by means of the computing entity and of the central database described above.

Advantageously, the management method of the invention comprises a step of receiving a new identification data item determined and transmitted by the computing entity after the first authentication.

Advantageously, the management method according to the invention comprises a step of storing the new identification data item in the memory module.

During the nominal phase, once the terminal is activated in the second network, the management method according to the invention comprises a second connection step for connecting the terminal to the first network via an interworking gateway. This second connection step allows establishing, using the new identification data item, a second authentication of the memory module by means of the computing entity and of the central database.

Following the second connection step, the management method of the invention preferably comprises a management step which consists of logging and transmitting to a local database the information relating to the various accesses of the terminal to the services of the second network. It is thus possible to have local billing on the second network.

Correspondingly, the invention also relates to the computer program comprising instructions for executing the steps of the management method as described above. This program has the same characteristics as those described above for the program for implementing the activation method.

Similarly, the invention relates to a computer-readable storage medium on which is stored a computer program comprising instructions for executing the steps of the management method as described above. This medium has the same characteristics as those described above for the storage medium for the program implementing the activation method.

The object of the invention further relates to a memory module for the activation and management of a terminal on a second network, said memory module being associated in a central database with a predetermined first network.

Said memory module advantageously comprises a storage means which contains a temporary identification data item before activation of the terminal in a second network.

Advantageously, the memory module according to the invention comprises an activation module that comprises an activation means; this activation means is configured for receiving on the first network, from a computing entity as described above, a new identification data item containing identification information relating to the second network, following an activation of the terminal in the second network.

Advantageously, the activation means is also configured to store this new identification data item in the storage means. This storage is achieved by replacing the temporary identification data item with the new identification data item determined by the computing entity based on the authentication.

Advantageously, the activation module comprises a connection means configured for establishing at least one connection of the terminal to the first network via an interworking gateway. Optionally, the connection means is also configured to send to the central database information relating to the second network where the terminal is activated.

Advantageously, the activation module comprises management means configured to log and transmit to a local database the information concerning the accesses by the terminal to the services of the second network.

Lastly, an object of the invention in another aspect relates to a terminal comprising a memory module as described above, in order to allow activation of the terminal in a second network.

In this manner, the object of the present invention, in its various functional and structural aspects, allows easily activating and managing on a second network a terminal comprising a memory module initially associated with a first network. This activation then allows access to and management of services of the second network, as the user of the terminal is recognized as a subscriber on the second network.

BRIEF DESCRIPTION OF THE DRAWINGS

Other features and advantages of the invention will be apparent from the following description provided with reference to the attached FIGS. 1-4 which illustrate an embodiment having no limiting character and in which.

DETAILED DESCRIPTION OF ILLUSTRATIVE EMBODIMENTS

A computing entity, a memory module, a terminal, an activation method, and a management method, in accordance with an advantageous embodiment of the invention, will now be described with reference to FIGS. 1 to 4.

Recall that allowing activation on a second network, of a terminal comprising a memory module associated in a central database with a predetermined first network, is one of the aims of the invention.

Figure 1:
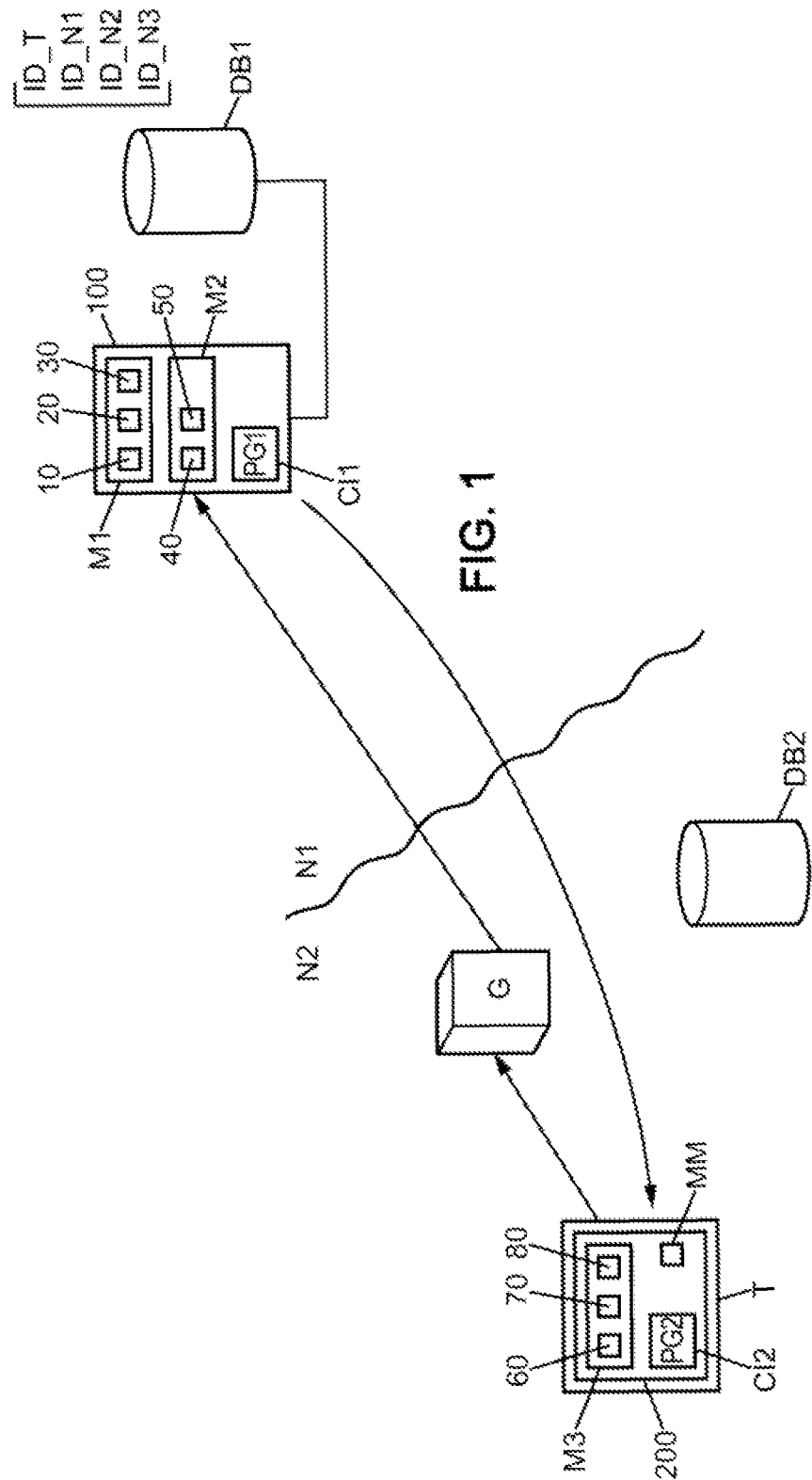
FIG. 1 schematically represents the activation of a terminal on a second network according to an advantageous exemplary embodiment of the invention.

In the embodiment described herein and as illustrated in FIG. 1, the terminal T comprises a memory module 200, such as a SIM (Subscriber Identity Module) card for example.

Figure 2:
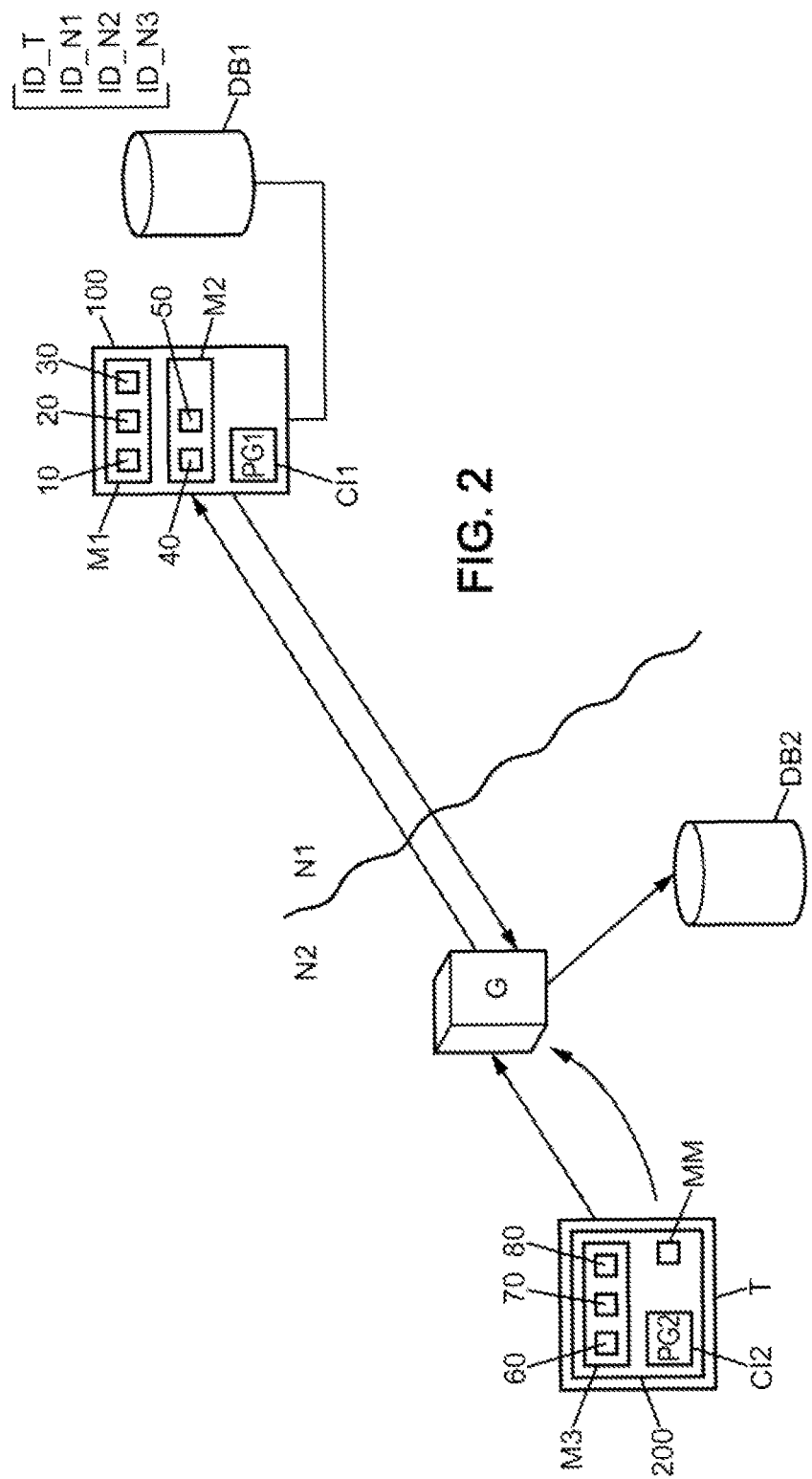
FIG. 2 schematically represents the use of a terminal on a second network after activation according to an advantageous exemplary embodiment of the invention.
Figure 3:
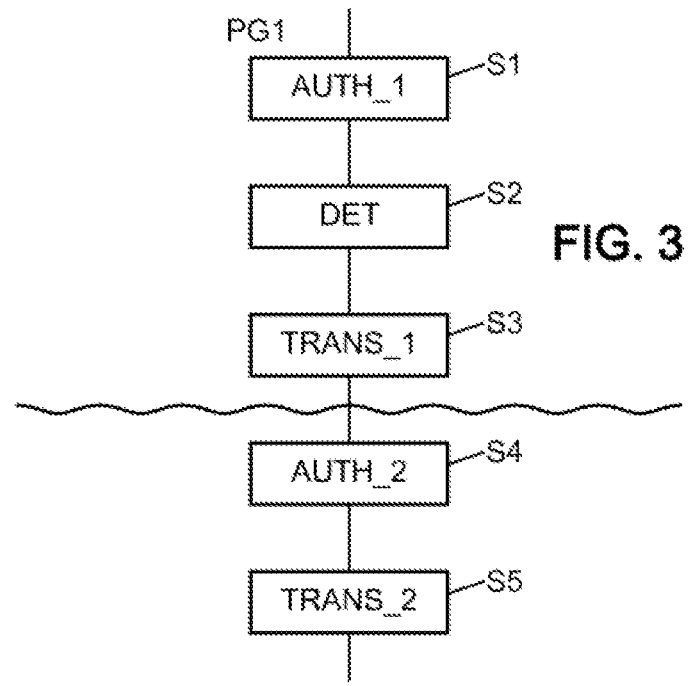
FIG. 3 schematically represents a flowchart illustrating the activation method according to an advantageous exemplary embodiment of the invention.
Figure 4:
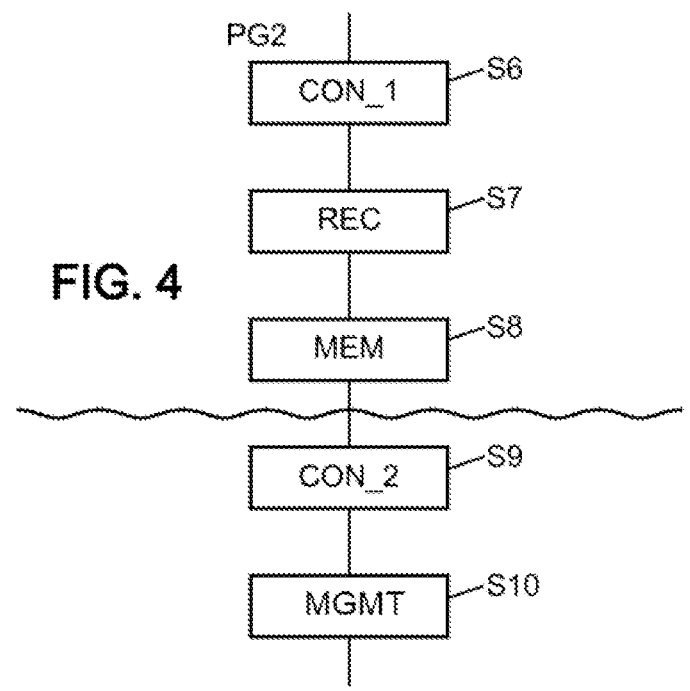
FIG. 4 schematically represents a flowchart illustrating the management method according to an advantageous exemplary embodiment of the invention.

In the example described here, and illustrated in particular in FIGS. 1 and 2, the memory module 200 is supplied, by the manufacturer of the terminal T, with a temporary identification data item ID_T stored in memory means MM. Of course, it is alternatively quite possible for the manufacturer of the terminal T to deliver the terminal to a manufacturer of memory modules 200 which then integrates the module with the terminal, or to have a third party (a systems integrator) receive the memory module 200 and the terminal T and integrate them.

The initial assignment of a temporary identification data item ID_T to the memory means MM of the memory module 200 is characteristic of the invention. This assignment of a temporary data item makes it possible to produce a single type of memory module for delivery in multiple countries.

As a non-limiting example, this identification data item can be IMSI (International Mobile Subscriber Identity) data. This data then includes a unique number allowing a GSM or UMTS network for example to identify the subscriber.

According to the invention, the memory module 200 of the terminal T is associated in a central database DB1 with a predetermined first network N1.

In the exemplary embodiment described here, the central database DB1 is an HLR (Home Location Register) database. This database DB1 therefore contains information relating to any subscriber authorized to use the predetermined networks.

In the example described here, the memory module 200 has a specific activation module M3 that includes a connection means 70 for establishing a connection of the terminal T to the first network N1 via an interworking gateway G, this gateway G possibly being for example a GGSN (Gateway GPRS Support Node) gateway.

In the example described here and as illustrated in FIG. 1, in the activation phase, the terminal T therefore establishes an initial connection S6 with the first network N1. Following this initial connection S6, the first authentication means 10 of the first authentication module M1 of the computing entity 100 authenticates the memory module 200, in a first authentication step S1, using the temporary identification data item ID_T.

During this first connection, information relating to the second network N2 where the terminal T is activated is sent to the computing entity 100. This information is processed by the determination means 20 which, in a determination step S2, compares this information with the predetermined identification data items ID_N1, ID_N2, ID_N3 in the central database DB1, each of these data items being for example associated with a network predetermined by the carrier according to the country or geographical area. This therefore requires that the identification data items ID_N1, ID_N2, ID_N3 be previously linked in this pre-established database DB1 to the various networks to which the terminal T may potentially be switched, in order to allow local billing for such traffic.

In any case, this determination allows assigning a new identification data item, for example ID_N2, to the memory module 200, and more specifically to the memory means MM, so that the memory module 200 is recognized as activated on the network, for example the second network N2.

This determination of a new identification data item is characteristic of the present invention: it is critical in order to allow changing from roaming traffic to local traffic.

Once determined, this identification data item ID_N2 is sent directly to the memory module 200 by a first transmission means 30, in a first transmission step S3.

The activation module M3 of the terminal T receives this data item ID_N2 in a receiving step S7 and stores this new data item on the storage means MM in a storage step S8.

The module 200 is now ready to be activated: the user of the terminal T will be recognized as a subscriber to the services of the second network N2.

Thus, in the nominal phase shown in FIG. 2, the user of the terminal T reconnects to the second network N2 in a second connection S9, possibly after a reset or reboot of his terminal T.

This second connection S9 to the second network N2 triggers a new authentication with the central database DB1. This second authentication step S4, which is done via the gateway G, is performed by the second authentication module M2 which includes a second authentication means 40 adapted to compare the identification data item ID_N2 with the central database DB1.

The result of this comparison is then sent by a transmission means 50 in a second transmission step S5 to the network N2; said network is able to process this result and recognize that the identification data item ID_N2 does indeed correspond to an element within the set of identifiers for the network to which the GGSN is connected.

As mentioned above, in an alternative embodiment not shown here, the first M1 and second M2 authentication means may be a single entity.

In the example described here, the terminal T can then communicate over the second network N2, and the gateway G does not send the call data records to the original first network N1.

Thus, in this example, the terminal T comprises a management means 80 which manages S10 by logging and transmitting to a local database DB2 all the information relating to the various communications and services used on the second network N2. This database DB2 is associated with the second network N2.

One will note that in the present invention, authentication of the terminal on the second network allows local billing and administration, even if said authentication is physically linked to a computing entity of the original first network.

Use of such a technology provides subscribers with very wide coverage of possible networks and favorable local pricing. It also helps with developing multicarrier plans offering coverage across multiple countries.

Advantageously, one will note that the authentication part described above remains unchanged throughout the life of the terminal T and of the memory module 200.

Lastly, in the example described here and as shown in FIGS. 1 and 2, it is understood that the various steps of the activation and management method are respectively controlled and implemented by first PG1 and second PG2 computer programs contained in first CI1 and second CI2 storage media: the storage medium CI1 being integrated into the computing entity 100 and the storage medium CI2 being integrated into the memory module 200.

The invention allows the carrier to implement a single authentication algorithm on all equipment of the original network; there are therefore very few changes to be made to the existing network architecture in order to implement such technology: implementation of a computer program incorporating an activation, authentication, and management algorithm on the existing equipment. The terminal manufacturers will also have very few changes to make: assigning a unique temporary identification data item on the memory card, and no changes to the terminal.

With the invention, the first network, referred to as the original network, no longer has to support all the traffic, as is the case with roaming traffic for example. The solution according to the invention allows activation and authentication while roaming, and the traffic and its management become local.

Similarly, with the invention, it is no longer necessary to preload authentication algorithms after a memory module is issued.

The invention thus enables manufacturers of terminals with integrated memory modules to provide a single product to all their customers: said product incorporates a single memory module including temporary identification data, which will then need to be updated upon activation of the terminal on one of the predetermined networks by the manufacturer or carrier.

An exemplary object of the invention aims to solve the various technical problems mentioned above in the background section, while taking into consideration current manufacturing constraints in the context of the invention.

The ability to design a single type of terminal containing a single type of memory module which can be used in multiple countries is one of the aims of the invention.

An object of the invention enabling the activation, on a second network, of a terminal comprising a memory module associated in a central database with a predetermined first network, while minimally modifying the memory module and existing network architecture.

It should be observed that this detailed description focuses on a particular embodiment of the present invention, but in no case is this description intended to place any limitations on the object of the invention; rather, it is intended to eliminate any inaccuracies or misinterpretation of the following claims.

The invention claimed is:

1. A method for activating a terminal comprising a memory module initially containing a temporary identification data item prior to the terminal being connected to a network using said memory module, said temporary identification data item being a one-time use identification data item destined to be used for a first connection ever of the terminal to a network using said memory module, said temporary identification data item being further stored in a central database within a first network, said central database containing, for said temporary identification data item, predetermined identification data items each associated with a predetermined network among a plurality of networks, wherein said method comprises the following acts performed by a computing entity in the first network:

following a first ever connection of the terminal to a network using said memory module, wherein the terminal connects to the first network through a second network connected to the first network via an interworking gateway, a first step of the computing entity authenticating the memory module with the central database by using the temporary identification data item, a second step of the computing entity determining a new identification data item for the memory module by selecting the predetermined identification data item of the central database corresponding to the second network based on information identifying the second network which are sent to the central database during said first ever connection, and a first transmission step of the computing entity transmitting this new identification data item to the memory module in order to store this new identification data item in the memory module.

2. The method according to claim 1, further comprising, following a further connection of the terminal to the first network via the interworking gateway, a second authentication step of authenticating the memory module with the central database by using the new identification data item.

3. A non-transitory computer-readable storage medium comprising a computer program stored thereon and comprising instructions executing a method for activating a terminal comprising a memory module initially containing a temporary identification data item prior to the terminal being connected to a network using said memory module, said temporary identification data item being a one-time use identification data item destined to be used for a first connection ever of the terminal to a network using said memory module and being further stored in a central database within a first network, said central database containing, for said temporary identification data item, predetermined identification data items each associated with a predetermined network among a plurality of networks, wherein said method comprises the following acts performed by a computing entity in the first network:

following a first ever connection of the terminal to a network using said memory module, wherein the terminal connects to the first network through a second network connected to the first network via an interworking gateway, a first step of the computing entity authenticating the memory module with the central database by using the temporary identification data item, a second step of the computing entity determining a new identification data item for the memory module by selecting the predetermined identification data item of the central database corresponding to the second network based on information identifying the second network which are sent to the central database during said first ever connection, and a first transmission step of the computing entity transmitting this new identification data item to the memory module in order to store this new identification data item in the memory module.

4. A computing entity in a first network for activating a terminal comprising a memory module initially containing a temporary identification data item prior to the terminal being connected to a network using said memory module, said temporary identification data item being a one-time use identification data item destined to be used for a first connection ever of the terminal to a network using said memory module and being further stored in a central database within a first network, said central database containing, for said temporary identification data item, predetermined identification data items each associated with a predetermined network among a plurality of networks, wherein said computing entity comprises:

a first authentication module comprising:

a) a first authentication means configured to allow authentication of the memory module with the central database by means of the temporary identification data item, following a first ever connection of the terminal to a network using said memory module, wherein the terminal connects to the first network through a second network connected to the first network via an interworking gateway, b) a determination means configured for determining a new identification data item for the memory module by selecting the predetermined identification data item of the central database corresponding to the second network based on information identifying the second network which are sent to the central database during said first ever connection, and c) a first transmission means configured for transmitting this new identification data item to the memory module in order to store this new identification data item in the memory module.

5. The computing entity according to claim 4, comprising a second authentication module comprising a second authentication means configured to enable authentication of the memory module with the central database by means of the new identification data item, following a further connection of the terminal to the first network via the interworking gateway.

6. A method of managing, in a second network, a terminal comprising a memory module initially containing a temporary identification data item prior to the terminal being connected to a network using said memory module, said temporary identification data item being a one-time use identification data item destined to be used for a first connection ever of the terminal to a network using said memory module and being further stored in a central database within a first network, said central database containing, for said temporary identification data item, predetermined identification data items each associated with a predetermined network among a plurality of networks, wherein said method of managing comprises:

a first step of establishing a first connection ever of the terminal to a network using said memory module containing the temporary identification data item, wherein the terminal connects to the first network through a second network connected to the first network via an interworking gateway, in order to establish, using the temporary identification data item, a first authentication of the memory module by using a computing entity and the central database, a step of receiving a new identification data item determined and transmitted by the computing entity after the first authentication, the new identification data being determined for the memory module by selecting the predetermined identification data item of the central database corresponding to the second network based on information identifying the second network which are sent to the central database during said first ever connection, and a step of storing the new identification data item in the memory module.

7. The method according to claim 6, comprising a second connection step of connecting the terminal to the first network via an interworking gateway in order to establish, using the new identification data item, a second authentication of the memory module by using the computing entity and the central database.

8. The method according to claim 7, comprising, following the second connection step, a management step comprising logging and transmitting to a local database the information relating to the various accesses of the terminal to services of the second network.

9. A non-transitory computer-readable storage medium comprising a computer program stored thereon and comprising instructions executing steps of a method of managing, in a second network, a terminal comprising a memory module initially containing a temporary identification data item prior to the terminal being connected to a network using said memory module, said temporary identification data item being a one-time use identification data item destined to be used for a first connection ever of the terminal to a network using said memory module and being further stored in a central database within a first network, said central database containing, for said temporary identification data item, predetermined identification data items each associated with a predetermined network among a plurality of networks, wherein said method of managing comprises:

a first step of establishing a first connection ever of the terminal to a network using said memory module containing the temporary identification data item, wherein the terminal connects to the first network through a second network connected to the first network via an interworking gateway, in order to establish, using the temporary identification data item, a first authentication of the memory module by using a computing entity and the central database, a step of receiving a new identification data item determined and transmitted by the computing entity after the first authentication, the new identification data being determined for the memory module by selecting the predetermined identification data item of the central database corresponding to the second network based on information identifying the second network which are sent to the central database during said first ever connection, and a step of storing the new identification data item in the memory module.

10. A memory module allowing activation and management of a terminal on a second network, the memory module comprising:

a storage means initially containing a temporary identification data item prior to the terminal being connected to a network using said memory module, said temporary identification data item being a one-time use identification data item destined to be used for a first connection ever of the terminal to a network using said memory module and being further stored in a central database within a first network, said central database containing, for said temporary identification data item, predetermined identification data items each associated with a predetermined network among a plurality of networks; and an activation module that comprises:

a connection means configured for establishing a first connection ever of the terminal to a network using said memory module containing the temporary identification data item, wherein the terminal connects to the first network through a second network connected to the first network via an interworking gateway; and an activation means configured:

a) for transmitting to the central database, via the interworking gateway, information identifying the second network, b) for receiving from a computing entity on the first network a new identification data item determined for the memory module by selecting the predetermined identification data item of the central database corresponding to the second network based on information identifying the second network and c) for storing said new identification data item in the storage means.

11. The memory module according to claim 10, wherein the activation module comprises management means configured for logging and transmitting to a local database the information relating to the various accesses of the terminal to the services of the second network.

12. A terminal comprising a memory module according to claim 10, in order to allow activation of the terminal in the second network.

* * * * *